United States Patent
Bergmann et al.

(10) Patent No.: US 7,260,121 B2
(45) Date of Patent: Aug. 21, 2007

(54) DRIVER FOR POCKELS CELL AND USING THIS POCKELS CELL WITHIN LASER SYSTEMS

(76) Inventors: Thorald Horst Bergmann, Adalbert-Stifter-Str. 8, D-82418 Murnau (DE); Ralf Knappe, Lerchenstr. 3B, Kaiserslautern (DE) D-67661

( * ) Notice: Subject to any disclaimer, the term of this patent is extended or adjusted under 35 U.S.C. 154(b) by 524 days.

(21) Appl. No.: 10/698,464

(22) Filed: Nov. 3, 2003

(65) Prior Publication Data
US 2004/0101001 A1    May 27, 2004

(30) Foreign Application Priority Data
Nov. 7, 2002    (DE) .................. 102 51 888

(51) Int. Cl.
*H01S 3/115* (2006.01)
(52) U.S. Cl. ........................... 372/12
(58) Field of Classification Search ............ 372/12
See application file for complete search history.

(56) References Cited
U.S. PATENT DOCUMENTS
5,361,275 A * 11/1994 Opower ................. 372/108

2001/0038074 A1 * 11/2001 Zhang et al. ........... 250/341.8
2004/0102767 A1 * 5/2004 Stingl et al. ............. 606/11

FOREIGN PATENT DOCUMENTS
DE        36 30 775 C2    3/1988
WO   WO 200228305 A1 * 4/2002

* cited by examiner

Primary Examiner—Minsun Oh Harvey
Assistant Examiner—Tod T. Van Roy

(57) ABSTRACT

Driver for Pockels cells and using this Pockels cell within laser systems

The driver i.e. the electrical control of the Pockels cell is modified from the standardly known H-configuration using the switches S1, S2A; S1A, S2 A by adding at least one more switch (S2B; S1B; S2B). This switch can either replace the usually used recharging resistors (R2) or can be placed to these in parallel. It is also possible to use an arrangement using 4 switches (S1A, S2A, S1B, S2B) and no recharging resistors at all. Using such a driver with a Pockels cell pulses can be selected in laser systems more efficiently. Pulse sequences with well defined widths and spacing can be produced for certain application.

13 Claims, 7 Drawing Sheets

DRIVER FOR POCKELS CELL AND USING THIS POCKELS CELL WITHIN LASER SYSTEMS

BACKGROUND OF THE INVENTION a) Field of the Invention

Driver for Pockels cell and using this Pockels cell in laser systems.

This invention relates to a driver or electrical high voltage control for a Pockels cell and application of a Pockels cell controlled with said driver in a laser system and applications of said laser systems.

A Pockels cell generally consists of a birefringent crystal which is placed into and oriented in an adequate way to a monochromatic and polarized laser beam. In combination with some further optical elements, such as polarizers or mirrors, this Pockels cell can, by applying an electrical voltage ranging from 100V to a few kilovolts a) allow or disallow the passage of light b) direct the light on two different paths through an optical system The voltage necessary to reach the two named states of the system are determined by the crystal parameters and the wavelength of the light used. There are applications of Pockels cells demanding a very fast switching of the voltage on and off, whereby both transition times need to be in the order of a very few nanoseconds. Some applications only need one very fast transition, either switching on or off, whereby the other transition time may well reach microseconds. This invention relates to the arrangement and application of a device where both transition times need to be fast.

This Pockels cell, combined with an adequate switchable high voltage source can be used to switch on and off short laser pulses with a duration of a few nanoseconds (ns) or ultrashort laser pulses with durations of picoseconds (ps) or femtoseconds (fs), meaning that either the intensity of said laser pulses is modified or their direction of propagation is changed. Ultrashort laser pulses are known to be produced by the method of mode coupling. By principle this method of mode coupling will always produce the pulses at very high repetition rates (greater than 10 MHz, typically from 70 to 200 MHz for solid state lasers) and low energy of the individual laser pulses (nanajoules, typically 0.1 to 50 nJ). Should it be necessary to use single pulses or groups of pulses, quite often Pockels cells are used to select these pulses. These Pockels cells must first be switched on in the time span between two such laser pulses which are emitted by the laser source at a spacing of typically 6 to 15 nanoseconds, and switched off again after letting one laser pulse through only 6 to 15 nanoseconds later.

Often there is the need for ultrashort laserpulses with significantly higher energy (e.g. 1000 to 100000 times higher) than can be produced directly via mode coupling. Typical applications of such ultrashort high power pulses are nonlinear optics and materials processing. In such case, the selected pulses are transmitted through optical amplifiers, passing these and gaining energy in passing as often as necessary to attain the desired energy. These optical amplifiers can be arranged as linear or regenerative amplifiers.

A regenerative amplifier is known to have an amplifying medium placed within a resonator. The laser pulses selected by the first Pockels cell are optically switched into the resonator with a second Pockels cell, amplified as they pass the amplifying medium again and again, and finally switched out by this second Pockels cell. In order to switch the pulses in and out of the resonator, it is essential that the voltage applied to this Pockels cell is switched on and off in less than the turn-around time of the resonator of the regenerative amplifier. Thus, in order to couple a laser pulse into the amplifier, it is mandatory to switch on the voltage to be applied to the Pockels cell in only a few nanoseconds. Likewise, to extract the amplified pulse from the resonator, the voltage applied to the Pockels cell has to be removed just as fast.

The amplification procedure used in regnerative amplifiers is seriously restricted by the presently available high voltage controls for Pockels cell, their switching times being too slow, their repetition rates too small and their imprecision of switching giving low contrast. Their switching times of many nanoseconds restricts the use of mode coupled laser source to ones with repetition rates below 100 MHz and also necessitate regenerative amplifiers with large resonators having turn-around times of more than 10 ns. Typical repetition rates of less than 20 kHz are too low for laser materials processing systems using Pockels cells within the laser system to be economically effective.

If linear amplifiers are used, the pulses selected from the ultra-short pulse laser pass through the amplifying medium without any further optical switch. Since this method allows fewer passes through the amplifying medium, these amplifiers are mainly used when pulse energy is low or when very high amplification is desired. The main disadvantage according to the state of art here is the low contrast between the selected and the not selected pulses, which, using presently available high voltage controls for the Pockels cells is only about 300:1. The residual transmission of the not selected pulses results in a background radiation whose intensity is often higher than the energy of the selected laser pulses. Take as an example a laser pulse source emitting at a repetition rate of 60 MHz with an energy of the individual pulse of 30 nJ. Selecting pulses with a repetition rate of 20 kHz gives an average power of 20 kHz×30 nJ=0.6 mW. In between the selected pulses there will be 3000 unselected pulses that will, with the above contrast, only be a factor of 300 weeker. Thus, the average power of the background radiation will be a factor of 10 times higher which is 6 mW. Any linear amplifier amplifying these pulses will transfer 91% of its stored energy to background radiation and only 9% to the selected laser pulses. For this reason, using state-of-the-art systems, it is presently not possible to use Pockels cells for selection of pulses in laser systems with high amplification. Rather pulse selectors with higher contrast, such as acouto-optic modulators (AOM) have to be used. These modulators however have other serious disadvantages such as low transmission and low destruction intensities.

b) Description of Related Art

Drivers for Pockels cells at present state of art are configured as the example in FIG. 1a shows. In the following description this configuration will be designated as H-configuration. This presently known H-configuration has two nodes SK1 and SK2, which are connected to the Pockels cell. From the nodes SK1 and SK2 emanate four wires that form the four legs of the letter H. The first node SK1 is connected via a first wire (with resistor R1) to the high voltage supply HV, via a second wire and switch S1 to ground. The second node SK2 is connected via a third wire (with resistor R2) to the high voltage supply HV, via a fourth wire and switch S2 to ground. The capacitors CS1 and CS2, connected in parallel to the switches S1 and S2 show their intrinsic switch capacitances. CP designates the capcaitance of the Pockels cell and P1 and P2 are the electric potentials of the nodes SK1 and SK2 respectively. The switches designated by S1 and S2 are high voltage switches. These high voltage switches are capable of switching voltages from several kilovolts to several tens of kilovolts with transition times in the order of a few nanoseconds. Usually these switches can be controlled with TTL signals. The inner construction of these switches is state-of-the-art, an example is described in patent DE 3630775 C2. Likewise the generation of the low voltage signals is state-of-the-art and will not be discussed here.

The mode of operation of this state-of-the-art circuit is shown in FIG. 1$b$. To start with, both switches S1 and S2 are open. Thus, no voltage is applied to the Pockels cell. Closing switch S1 will apply a voltage to the Pocels cell. Then closing S2, the Pockels cell will be discharged. Waiting some time, usually dictated by the application in question, both switches are opened simultaneously or shortly after one another. This will pull both connectors of the Pockels cell back to the potential of the high voltage source, with a time constant determined by R1 and CS1 respectively R2 and CS2. The timing diagram of FIG. 1$b$ designates this as the recharging phase. The purpose of resistor RBAL is to improve the shape of the voltage pulse on the Pockels cell while S1 is closed and S2 open. The timing diagram shows the sequence of switch states and the resulting voltage applied to the Pockels cell.

A further variant according to state-of-the-art is shown in FIG. 2. This is a simple push-pull switch, where always one switch is closed, the other one open. With switch S1A closed and S1B open, there is no voltage applied to the Pockels cell. With S1A open and S1B closed, the full high voltage is applied to the Pockels cell. The timing diagram for this variant shows the switching of these two switches simultaneously. Of course, it is also possible to open the closed switch a few nanoseconds before closing the open switch. The voltage would then change with the closing of the previously open switch.

Pockels cell drivers according to FIG. 1$a$ however have some serious disadvantages:

a) When only one of the switches S1 or S2 is closed, it is not the full voltage of the high voltage source that is applied to the Pockels cell, but only a portion given by the ratio of the capacitances $k=CS2/CP$. Thus it is necessary to increase the voltage of the high voltage source, which also increases the amount of energy consumed per switching action.

b) To increase the capcitance ratio by connecting capcaitors in parallel to the high voltage switches will not help, because while increasing the voltage applied to the Pockels cell this measure at the same time will also increase the amount of energy consumed per switching action, this increase in energy being caused by the charging and discharging of the added capacitors.

c) The time any switch is closed is usually dictated by its internal wiring. This will limit the maximum time that voltage can be applied to the Pockels cell.

d) This fixed closing time of the high voltage switches will also result in a time difference when both switches open again, resulting in a voltage difference across the Pockels cell during the recharging phase. Even, if both switches should open exactly at the same time, it is hardly possible to match the time constants of R1/CS1 and R2/CS2 so well as to completely prevent any voltage difference on the Pockels cell during the recharging phase. However, except at times when the application dictates fill voltage to be applied to the Pockels call, any residual voltage applied to the Pockels cell may be detrimental. The function of optical amplifiers may seriously be impaired by any residual light transmision of such an optical switching element.

A Pockels cell driver according to FIG. 2 avoids any residual voltage that might occur during a recharging phase, also this arrangement will deliver the full voltage of the high voltage source to the terminals of the Pockels cell, thus preventing any waste of energy. However, the time between closing and reopening a high voltage switch can not be arbitrarily small, resulting in a minimum time that voltage must be applied to the Pockels cell. 100 nanoseconds might here be a typical value.

SUMMARY OF THE INVENTION

Thus it is the object of the invention to provide a Pockels cell driver that allows a high repetition rate of switching at arbitrary duty cycle and perfectly held switch states. In particular, it is the object of the invention to provide a circuit for controlling Pockels cells that allows to select laser pulses with short switching times, high repetition rate of switching and good contrast between selected and not selected laser pulses. Furthermore, it is the object of the invention to provide applications of these Pockels cells in laser systems generating short or ultrashort laser pulses with high energy and minimal background radiation, and to provide applications of these laser systems.

The characterizing features of the invention are given in the independent claims.

Starting from the state-of-the-art described H-configuration of a Pockels cell driver, according to the invention one or two switches are either wired in parallel to the recharging resistors or replace them altogether.

Without making reference to the state-of-the-art H-configuration the driver according to the invention can be described as follows: The driver has one node connected to one connector of the Pockels cell, and a second node connected to the second connector of the Pockels cell. The first node is connected via a first wire (containing a resistor) with a first electric potential and via a second wire containing a switch with a second electric potential. The second node is connected via a third wire (containing a resistor) with a first electric potential and via a fourth wire containing a switch with a second electric potential. A driver according to the invention now has at least another switch that connects one of the nodes to the second electric potential.

Both the first and second electric potentials can be given by either the pole of a voltage source or ground.

The further one or two switches can be arranged in a number of different ways.

Taking the state-of-the-art H-configuration as a starting point where a charging resistor is placed into the first wire connecting the first node to the first electric potential and another charging resistor is placed into the third wire connecting the second node with the first electric potential, the further switch can be wired in parallel to one of these resistors and arranged in a fifth wire between one of the nodes and the first electric potential.

Extending the just described embodiment of the invention, another switch can be wired in parallel to the second charging resistor and arranged in a sixth wire between the other node and the first electric potential.

Instead of wiring the switches in parallel to the recharging resistors, the switches can replace one or both of the recharging resistors.

The Pockels cell driver according to the invention avoids the problem of residual voltage ocross the Pockels cell during the recharging phase, it can also operate at higher repetition rates of 100–200 kHz, whereas conventional drivers are only capable of running at 50 kHz.

Pockels cells with drivers according to the invention can be used advantageously in laser systems. Pockels cells with drivers according to the invention can be used as Q-switch within a laser resonator. They can be used outside of the laser resonator to select laser pulses. Such laser pulse selection can be done between a laser pulse source and an optical amplifier. Pockels cell drivers according to the invention can also be used within regenerative optical amplifiers. The applications just named can also be used cumulatively within laser systems, i.e. a laser system may contain a number of Pockels cells with drivers according to the invention.

A further application of such laser systems is the generation of specific laser pulse patterns with or without further amplifying these laser pulse patterns. These pulse patterns allow systems of lower complexity to be used for some procedures in materials processing or pump/probe experiments.

BRIEF DESCRIPTION OF THE DRAWINGS

The following figures show embodiments of Pockels cell drivers according to the invention.

DESCRIPTION OF THE PREFERRED EMBODIMENTS

Figure 3A:
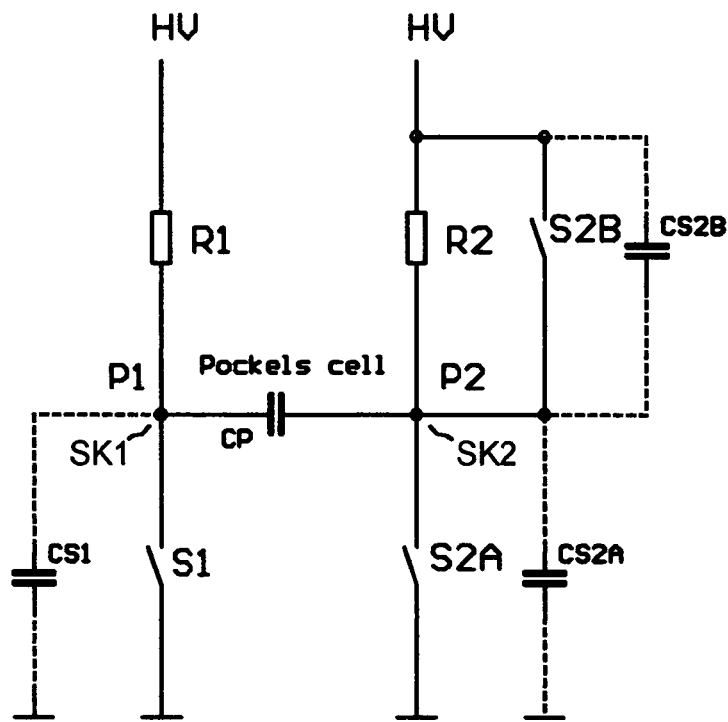
FIGS. 3a,b show a first embodiment of a Pockels cell driver according to the invention (a) and switch states and electric potentials during operation (b).

A first embodiment of the driver according to the invention in FIG. 3a modifies the state-of-the-art H-configuration by adding a high voltage switch S2B in parallel to one of the recharging resistors R2. The intrinsic capacitance of this switch S2b is denoted by CS2B drawn by dashed lines.

Figure 3B:
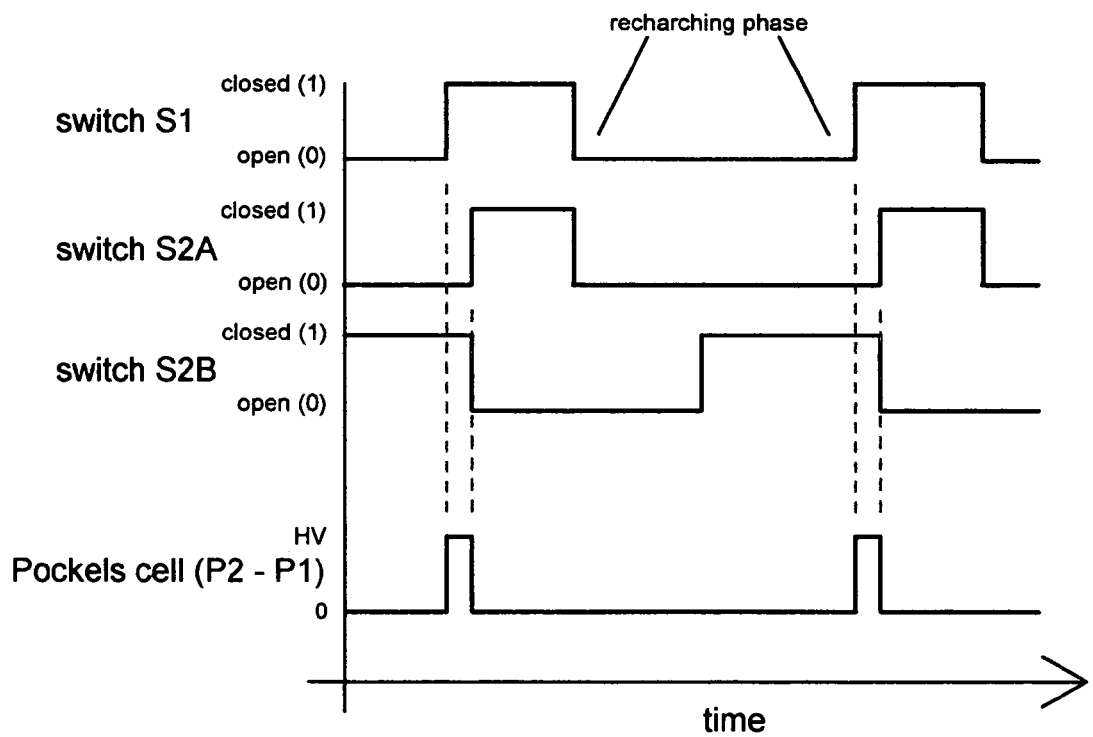

The operation of the driver from FIG. 3a is shown in FIG. 3b. Switch S2B must be closed before closing switch S1. Closing the switch S1 applies the complete voltage from the high voltage power supply to the Pockels cell. Synchronously with closing switch S2A, taking away the voltage across the Pockels cell, switch S2B is opened. During or after the recharging phase switch S2B is closed again.

Figure 2A:
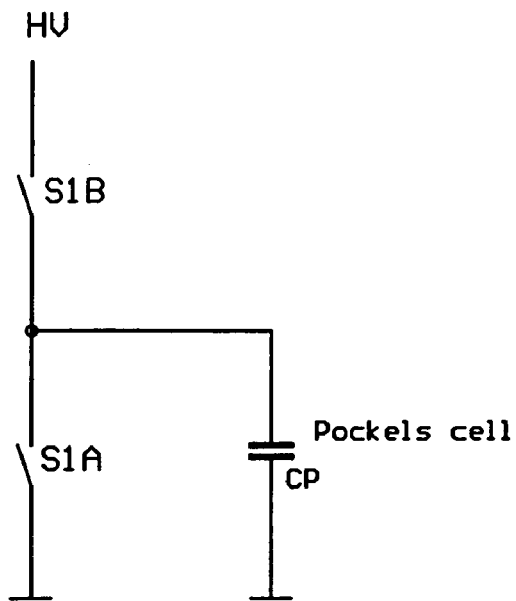
FIG. 2 shows another Pockels cell driver circuit (push-pull) according to state-of-the-art (a) and switch states and electric potentials during operation (b).
Figure 2B:
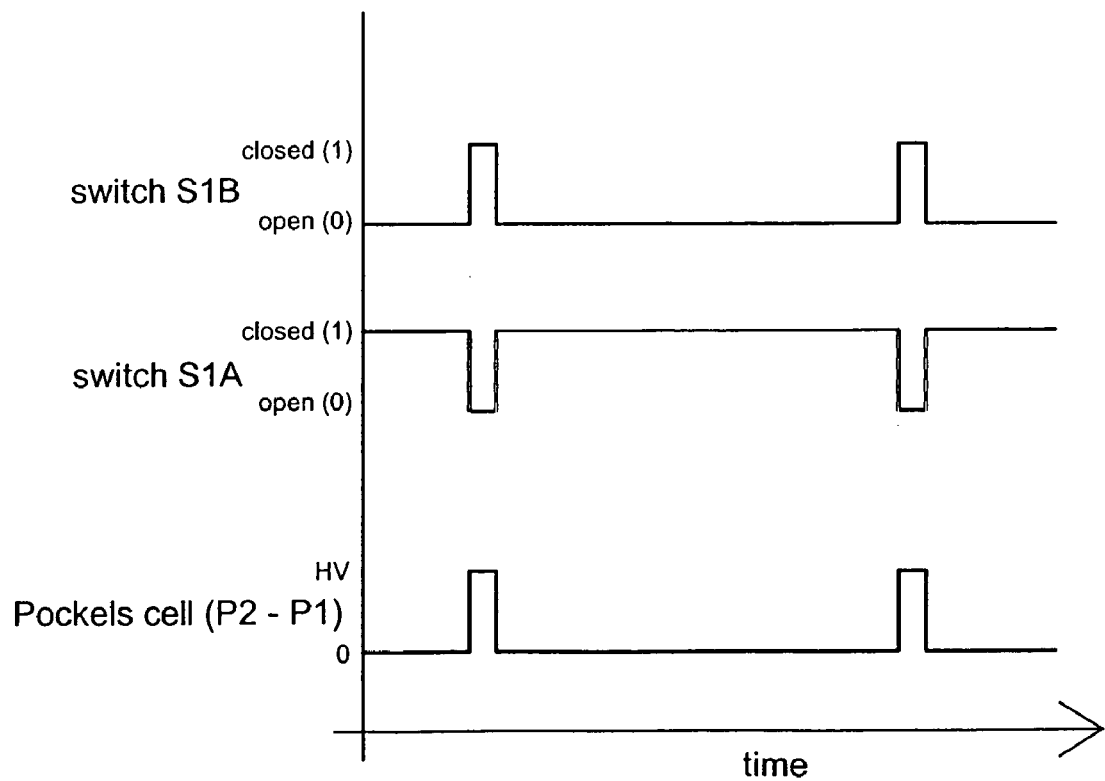
Figure 4:
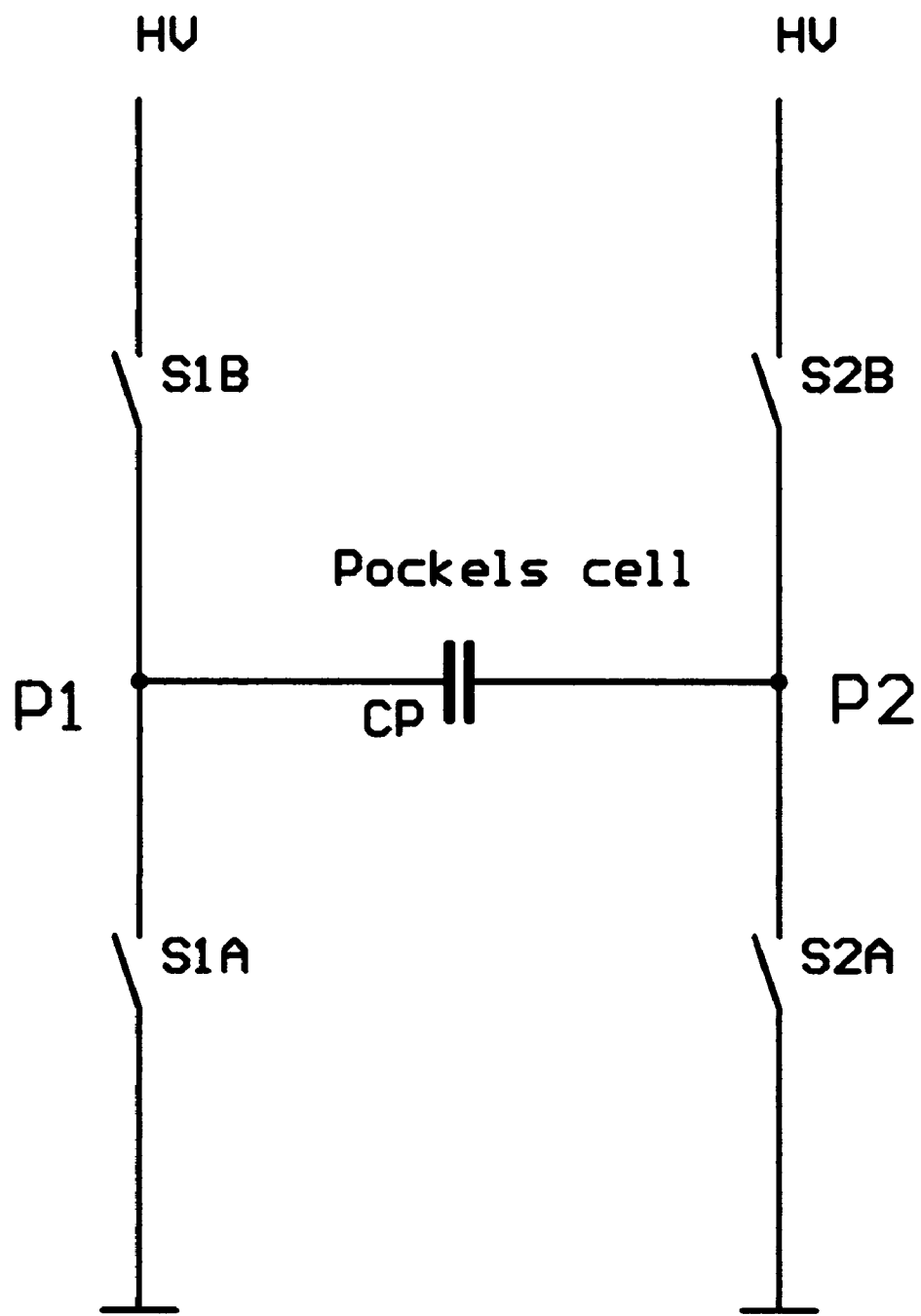
FIG. 4 shows a second embodiment of a Pockels cell driver according to the invention.

FIG. 4 shows another embodiment of the invention where both recharging resistors used in the H-configuration are replaced by switches S1B and S2B. Thus the nodes SK1 and SK2 are connected through only one wire (the first and third wire), containing each one switch (S1B, S2B) with the high voltage potential HV. The embodiment shown in FIG. 4 is thus in a certain sense a doubling of the push-pull switch shown in FIG. 2.

Figure 5A:
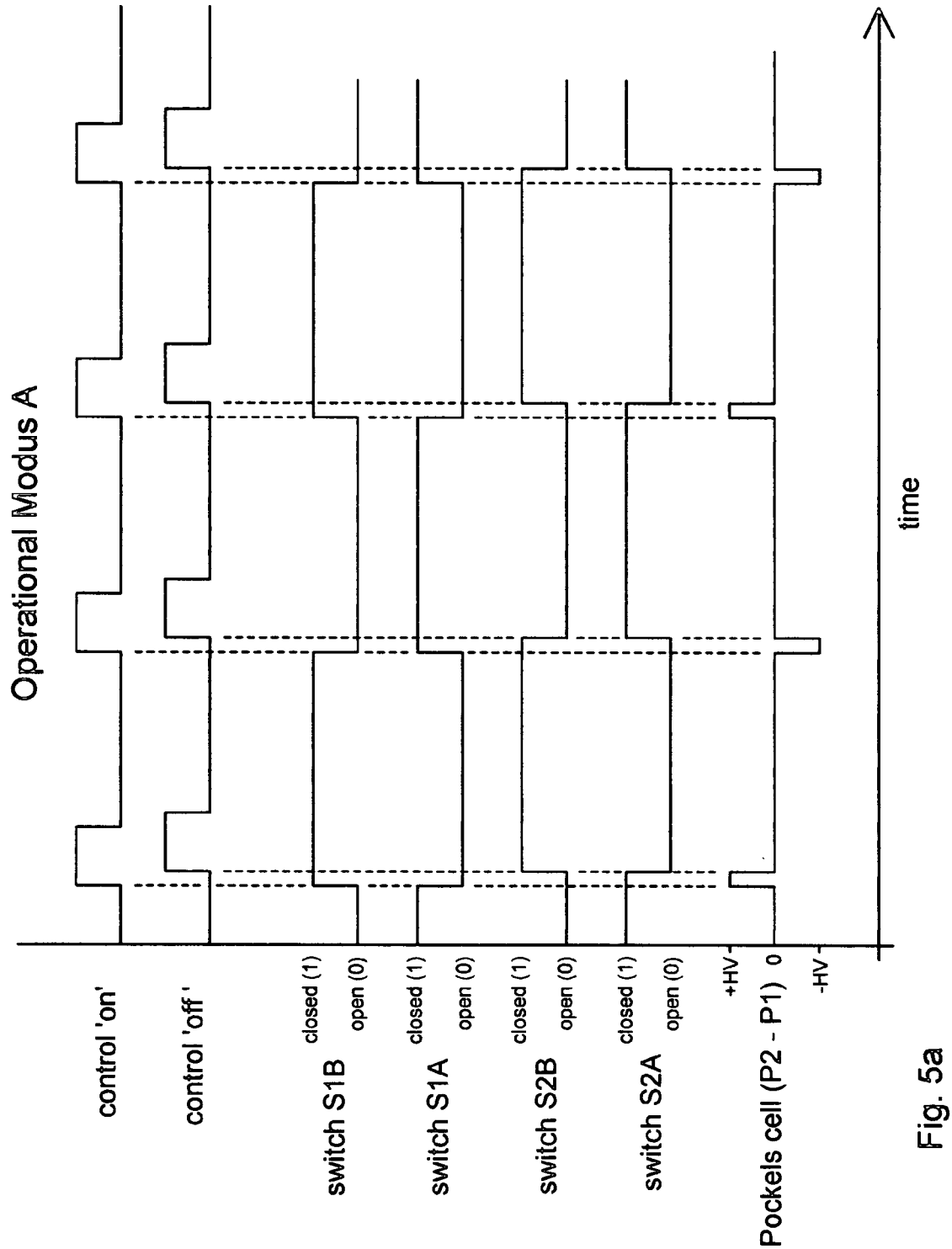
FIGS. 5a,b show two different operationla modes A and B of the embodiment of FIG. 4

According to the invention all four switches can be controlled by four different signals, as can be generated with delay generators that allow full freedom in specifying the time of the individual signal. For instance this allows alternating pulses with different properties. Just as well, as described in FIGS. 5a,b, it is possible to work with only two signals ON and OFF, if a circuit is provided which routes the control pulses alternatingly from one to the other switch. FIGS. 5a,b shows two variants of controlling the states of the four switches with only two control signals using the low-to-high transition of the control signals to induce changes in the state of the switches. Details of the necessary control circuits need not be discussed here, as these circuits can easily be fabricated with state-of-the-art methods.

Figure 5B:
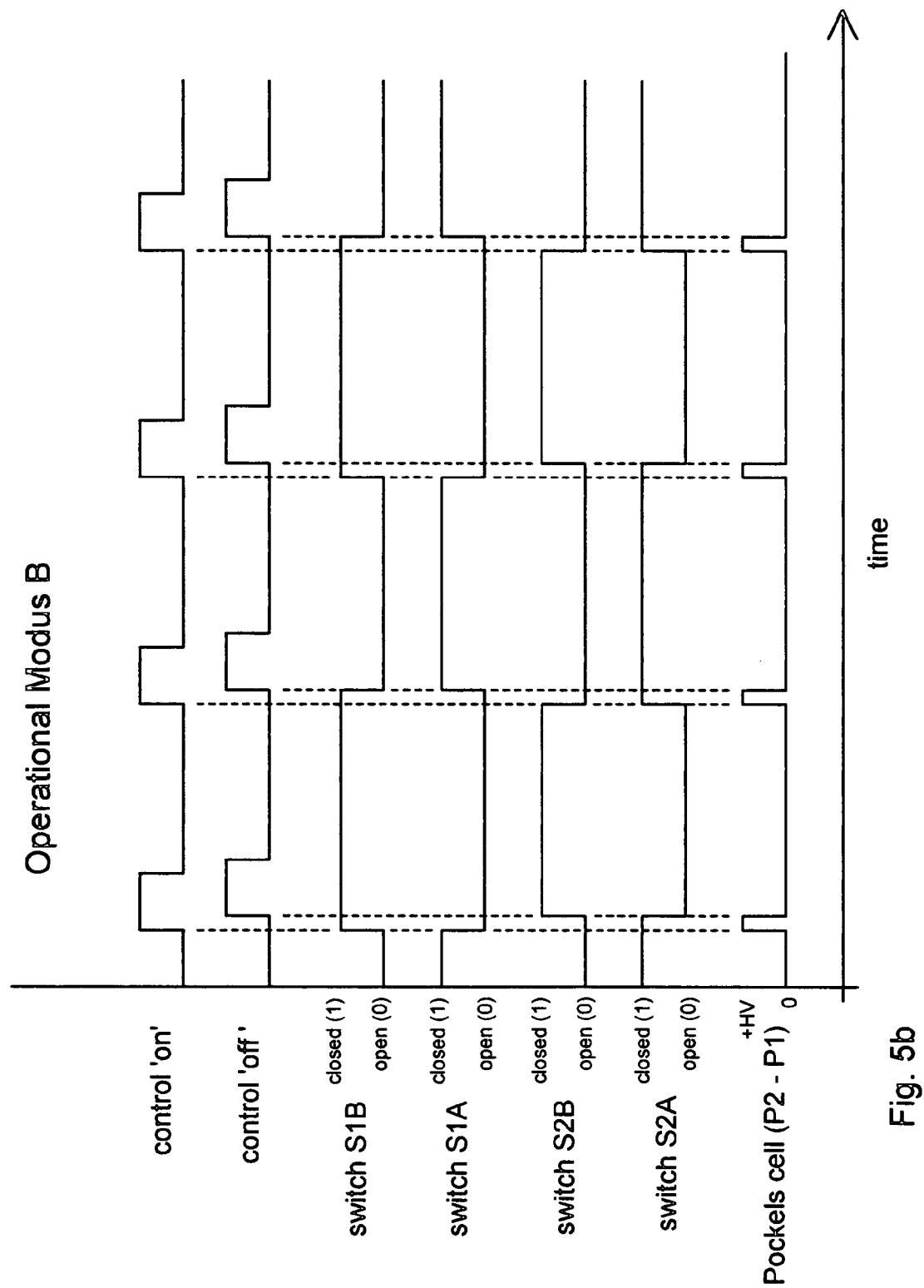

This invention provides a driver for Pockels cells which avoids ill-defined or badly defined voltages across the Pockels cell. FIGS. 5a,b show two different operational modi for a driver according to FIG. 4. The control signals ON and OFF are used to turn switches S1A, S1B, S2A, and S2B on and off. According to FIG. 5a (operational modus A) the control signal ON is always routed to switches S1A and S1B making them change their state, the signal OFF always being routed to switches S2A and S2B to change their states. According to FIG. 5b (operational modus B) the control signals ON and OFF are routed alternatingly, once to the switch pair S1A/S1B, the other time to the switch pair S2A/S2B.

Figure 1A:
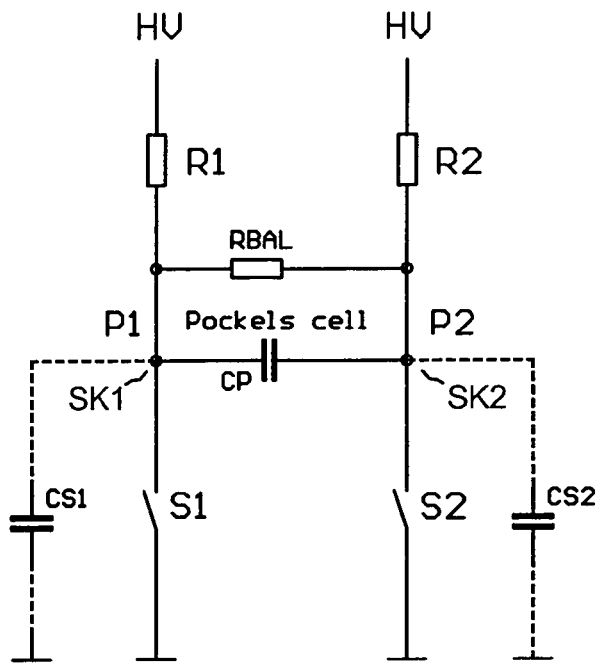
FIGS. 1a,b shows a Pockels cell driver circuit according to state-of-the-art (a) and switch states and electric potentials during operation (b).
Figure 1B:
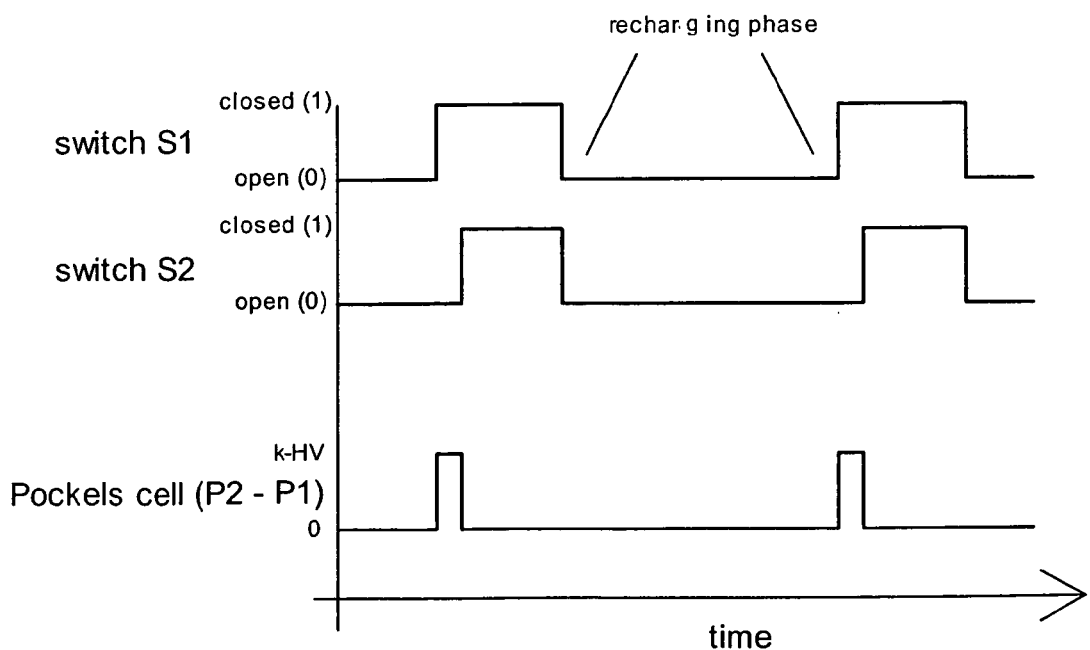

As can be easily seen from FIGS. 5a,b, the problem of residual voltage (during the recharging phase) across the Pockels cell which occurs for drivers of Pockels cells built according to FIG. 1 is completely avoided for drivers built according to FIG. 4.

Both operational modi A or B give twice the pulse repetition rate on the Pockels cell at only half the repetition rate of the switch pairs S1A/S1B and S2A/S2B. Normally no difference will be noticeable between operational modus A and B as the way the Pockels cell influences passing light does not depend on the polarity of the voltage applied. The timing diagrams always show the opening of a switch exactly synchronous to the closing of its counterpart switch, e.g. S1A and S1B, however it is also possible to open S1B a few nanoseconds before closing S1A.

Using devices according to the invention for controlling the voltage applied to Pockels cells within laser systems, new configurations of ultrashort pulse lasers are possible, which, at present state-of-the-art would not work or would not function properly, e.g. because their function would be impaired by undue background radiation.

Figure 6:
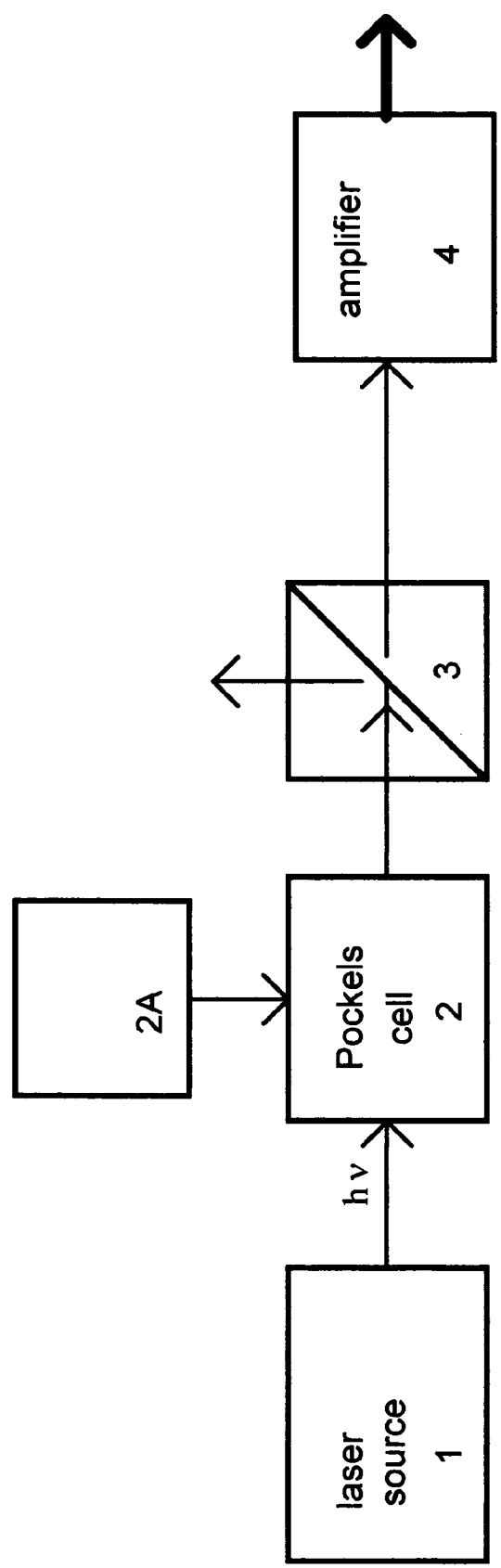
FIG. 6 shows an embodiment of the invention comprising a laser system with pulse laser source and a Pockels cell with a driver according to the invention.

A Pockels cell controlled by a circuit 2a according to the invention can, as shown in FIG. 6, select laser pulses between a laser pulse source 1 and a device of high optical amplification which will transfer its energy with high efficiency to the selected laser pulses. For instance, using a laser pulse source with a repetition rate of 60 MHz, it is possible to use a Pockels cell controlled with a driver circuit 2a according to the invention in order to select pulses with a repetition rate of 100–200 kHz at a contrast of 3000:1. The average power of the selected pulses will thus be a factor ten higher than the residual background radiation. The amplification of the pulses is improved a factor of 100 as compared with devices that use Pockels cells controlled by state-of-the-art circuits. There is a polarisation dependent element 3 between the Pockels cell 2 and the optical amplifier 4, which is oriented such that it will transmit light polarized in one direction while reflecting light of the other polarisation.

The embodiment of the invention shown in FIG. 6 arranges the Pockels cell externally to the laser resonator. A Pockels cell controlled with a circuit according to the invention can, by virtue of the high optical contrast and fast switching times, be used directly for laser pulse selection within the resonator as a Q-switch. In combination with a polarizing element, changing the high voltage applied to the Pockels cell will change the Q of the resonator within one turn-around time. As long as no voltage is applied to the Pockels cell, the laser pulses will bounce back and forth between the end mirrors of the resonator, being extract via state-of-the-art methods by using a polarizing element and applying voltage to the Pockels cell. Using a driver circuit according to the invention, pulses of higher energy can be selected than previously.

As a further variant, a Pockels cell controlled by a circuit accordiong to the invention can be arranged within the resonator of an optical amplifier 4. Here also pulses can be amplified by bouncing them back and forth several times and can finally be extracted using a polarisation dependent optical element and applying voltage to the Pockels cell.

Pockels cell 2, shown in FIG. 6 can be omitted, retaining the Pockels cell within the amplifier. Arbitrary combinations of the previously discussed applications and arrangements of Pockels cell controlled by devices according to the invention can be though of within laser systems as shown in FIG. 6.

A Pockels cell controlled by a circuit according to the invention can be used to select closely spaced pulse pairs at high repetition rate (e.g. 100 kHz) The time spacing between the two pulses can be adjusted from a minimum time of 30 ns up to the time the next pulse pair is selected. The first pulse can be used for excitation of some electronic state, the second pulse for detection or further modification of the electronic state. The second pulse induces a signal, e.g. the transmitted or reflectred light intensity of the second pulse, or some electric current, which is measured in dependance of the time difference between exiting and measuring pulse. Such experiments, generally termed pump-probe, need apparatus of much higher complexity with present state-of-the-art devices.

A laser system with Pockels cells driven by circuits according to the invention, that can generate double pulses with high repetition rate, definable spacing between the pulses and adjustable number of laser pulses per switching event, can be used advantageously in materials processing, by first using one or more laser pulses to modify the surface of the material, and then do some processing on the surface after some specific time with one or more further laser pulses. For instance, a first electrical pulse on the Pockels cell can generate a laser pulse which creates a plasma cloud above the material to be processed. A second, longer electrical pulse on the Pockels cell can generate a train of laser pulses which then pass the plasma cloud.

The invention claimed is:

1. A Pockels cell driver circuit, comprising
a first circuit node (SK1) to be connected with a first connector of the Pockels cell (CP) and a second circuit node (SK2) to be connected with a second connector of the Pockels cell (CP), wherein
the first circuit node (SK1) is connected with a first potential via a first switch (S1), and
the second circuit node (SK2) is connected with the first potential via a second switch (S2), wherein
both said circuit nodes (SK1, SK2) are connected with a second potential (HV) via a recharging resistor (R1, R2), respectively, and
only one (SK2) of the said circuit nodes (SK1, SK2) or both said circuit nodes (SK1, SK2) are connected with the second potential (HV) via a further switch (S2B), respectively, wherein
said Pockels cell driver circuit is further arranged to switch the voltage at the Pockels cell (PC) on and off by switching each one of the first switch (S1), the second switch (S2) and the further switch (S2B) on and off with one and the same repetition rate.

2. A Pockels cell driver circuit, comprising
a first circuit node (SK1) to be connected with a first connector of the Pockels cell (CP) and a second circuit node (SK2) to be connected with a second connector of the Pockels cell (CP), wherein
the first circuit node (SK1) is connected with a first potential via a first switch (S1), and
the second circuit node (SK2) is connected with the first potential via a second switch (S2), wherein
one of the said circuit nodes (SK1, SK2) is connected with a second potential (HV) via a recharging resistor, and the other one of the said circuit nodes (SK1, SK2) is connected with the second potential (HV) via a further switch, wherein
said Pockels cell driver circuit is further arranged to switch the voltage at the Pockels cell (PC) on and off by switching each one of the first switch (S1), the second switch (S2) and the further switch on and off with one and the same repetition rate.

3. A Pockels cell driver circuit, comprising
a first circuit node (SK1) to be connected with a first connector of the Pockels cell (CP) and a second circuit node (SK2) to be connected with a second connector of the Pockels cell (CP), wherein
the first circuit node (SK1) is connected with a first potential via a first switch (S1), and
the second circuit node (SK2) is connected with the first potential via a second switch (S2), wherein
said first circuit node (SK1) is connected with a second potential (HV) via a third switch (S1B) and said second circuit node (SK2) is connected with the second potential (HV) via a forth switch (S2B), wherein
said Pockels cell driver circuit is further arranged to switch the voltage at the Pockels cell (PC) on and off by switching each one of the first switch (S1), the second switch (S2), the third switch (S1B) and the forth switch (S2B) on and off with one and the same repetition rate.

4. The Pockels cell driver circuit according to one of the claims 1 to 3, wherein
low voltage control signals individually control each of the three or four switches (S1A, S1B, 52A, 52B) of the circuit.

5. The Pockels cell driver circuit according to one of the claims 1 to 3, wherein
only two control signals (ON, OFF) control all three or four switches (S1A, S1B, S2A, S2B) such that one of the control signals (ON) induces voltage to be applied to the Pockels cell and the other control signal (OFF) induces the removal of voltage from the Pockels cell.

6. A System comprising a Pockels cell and a Pockels cell driver circuit according to one of the claims 1 to 3 connected thereto.

7. A pulse laser system and a system according to claim 6 for the optical switching of laser pulses.

8. The pulse laser system according to claim 7, wherein the pulse laser system comprises a pulsed laser source (1)

having a laser resonator, wherein the Pockels cell (2) is arranged internally or externally to the laser resonator.

9. The pulsed laser system according to one of claim 7, wherein the pulsed laser system comprises a pulsed laser source (1) and an optical amplifier (4).

10. The pulsed laser system according to claim 9, wherein the system according to claim 6 is contained within the optical amplifier (4).

11. The pulsed laser system according to one of claim 8, wherein a further system according to claim 6 is contained within the optical amplifier (4).

12. An optical pump-/probe method by using a pulsed laser system according to one of claim 7, in which method
an optical excitation pulse and a delayed optical monitoring pulse are directed onto a medium, wherein
a signal induced by the delayed monitoring pulse is measured as a function of delay between the two pulses, wherein
the pulse sequence of excitation and monitoring pulses and the delay from one to another is determined by the Pockels cell and the driver circuit of the Pockels cell.

13. A material processing method by using a system according to anyone of claim 7, in which method
a first laser pulse is directed onto the material surface such that a plasma is generated at the surface, and
after some delay a number of further laser pulses is directed onto the plasma above the surface of the material, whereby
the pulse sequence of the first laser pulse and the number of further laser pulses and the delay between these laser pulses is determined by the Pockels cell and the driver circuit of the Pockels cell.

* * * * *